(12) United States Patent
Hung et al.

(10) Patent No.: US 10,150,504 B2
(45) Date of Patent: Dec. 11, 2018

(54) RESILIENT POWER DEVICE

(71) Applicant: National Taiwan Normal University, Taipei (TW)

(72) Inventors: Yi-Hsuan Hung, Taipei (TW); Hsueh-Chung Han, Tainan (TW); Ji-Jia Xu, Taipei (TW); Kai-Chieh Kang, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 15/653,965

(22) Filed: Jul. 19, 2017

(65) Prior Publication Data

US 2018/0201313 A1 Jul. 19, 2018

(30) Foreign Application Priority Data

Jan. 19, 2017 (TW) .............................. 106101788 A

(51) Int. Cl.
*B62D 11/18* (2006.01)
*F16H 63/00* (2006.01)
*B60K 25/00* (2006.01)
*B62D 11/00* (2006.01)

(52) U.S. Cl.
CPC ............ *B62D 11/183* (2013.01); *B60K 25/00* (2013.01); *F16H 63/00* (2013.01); *B60K 2704/04* (2013.01); *B62D 11/00* (2013.01)

(58) Field of Classification Search
CPC ...... B62D 11/183; B62D 11/00; B60K 25/00; B60K 2704/04; F16H 63/00
See application file for complete search history.

(56) References Cited

U.S. PATENT DOCUMENTS

| 2006/0196719 A1* | 9/2006 | Hasegawa ............ B60K 17/105 180/307 |
| 2013/0313068 A1* | 11/2013 | Mevissen ............... B60K 25/00 192/81 C |
| 2014/0196602 A1* | 7/2014 | Carlson ...................... F16J 1/00 92/172 |

\* cited by examiner

*Primary Examiner* — David J Hlavka
(74) *Attorney, Agent, or Firm* — Birch, Stewart, Kolasch & Birch, LLP

(57) ABSTRACT

A resilient power device is adapted to drive a transmission rod of a vehicle, and includes a housing, a rotary shaft adapted to extend and be spaced apart from the transmission rod along a first axis, a power release unit including a first rod and a second rod that extend and are spaced apart from each other along a second axis parallel to the first axis, a power storage clutch adapted to be connected between the transmission rod and the rotary shaft, a power release clutch connected between the first and second rods, a first gear unit mounted to the first rod and the transmission rod, a second gear unit mounted to the rotary shaft and said second rod, and at least one resilient member connected between the housing and the rotary shaft.

8 Claims, 11 Drawing Sheets

RESILIENT POWER DEVICE

CROSS-REFERENCE TO RELATED APPLICATION

This application claims priority of Taiwanese Patent Application No. 106101788, filed on Jan. 19, 2017.

FIELD

The disclosure relates to a power device, and more particularly to a resilient power device.

BACKGROUND

In recent years, green environmental protection consciousness is raised, and many countries in the world are devoted to look for and develop an alternative energy. Since transportation is an important point in this area, many car companies have developed different types of alternative energy methods for saving energy resources. For example, a mixed power system applied with electrical energy and hydrogen energy, and a power system applied with only electrical energy. However, very few companies can achieve its target with a power system applied with mechanical energy. It is desirable that, a power system applied with mechanical energy can be operated with low energy consumption, low pollution and high efficiency.

SUMMARY

Therefore, the object of the disclosure is to provide a resilient power device that can reduce energy consuming for a vehicle.

According to the disclosure, the resilient power device is adapted to drive a transmission rod of a vehicle, which extends along a first axis. The resilient power device includes a housing, a rotary shaft, a power release unit, a power storage clutch, a power release clutch, a first gear unit, a second gear unit and at least one resilient member. The housing is adapted for the transmission rod to extend rotatably thereinto. The rotary shaft is adapted to extend and is spaced apart from the transmission rod along the first axis. The power release unit includes a first rod and a second rod mounted rotatably in the housing, extending and spaced apart from each other along a second axis that is parallel to the first axis, spaced apart from the rotary shaft, and adapted to be aligned respectively with the transmission rod and the rotary rod along a direction perpendicular to the first and second axes. The power storage clutch is adapted to be connected between the transmission rod and the rotary shaft, so as to allow for connection and disconnection between the transmission rod and the rotary shaft. The power release clutch is connected between the first and second rods, so as to allow for connection and disconnection between the first and second rods. The first gear unit is mounted to the first rod and the transmission rod such that, rotation is transferred between the first rod and the transmission rod. The second gear unit is mounted to the rotary shaft and the second rod such that, rotation is transferred between the rotary shaft and the second rod. The at least one resilient member is connected between the housing and the rotary shaft. The resilient power device is transformable between a power storage state and a power release state. When the resilient power device is in the power storage state, the transmission rod and the rotary shaft are interconnected by the power storage clutch, and the first and second rods are disconnected from each other by the power release clutch, so as to allow the transmission rod and the rotary shaft to rotate in a first rotational direction, thereby deforming the at least one resilient member to store an elastic potential energy. When the resilient power device is transformed from the power storage state to the power release state, the transmission rod and the rotary shaft are disconnected from each other by the power storage clutch, and the first and second rods are interconnected by the power release clutch, so as to allow the rotary shaft to rotate in a second rotational direction, which is opposite to the first rotational direction, so as to return the at least one resilient member to its original shape, thereby releasing the elastic potential energy, after which the transmission rod is rotated in the first rotational direction by the second gear unit, the power release unit and the first gear unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
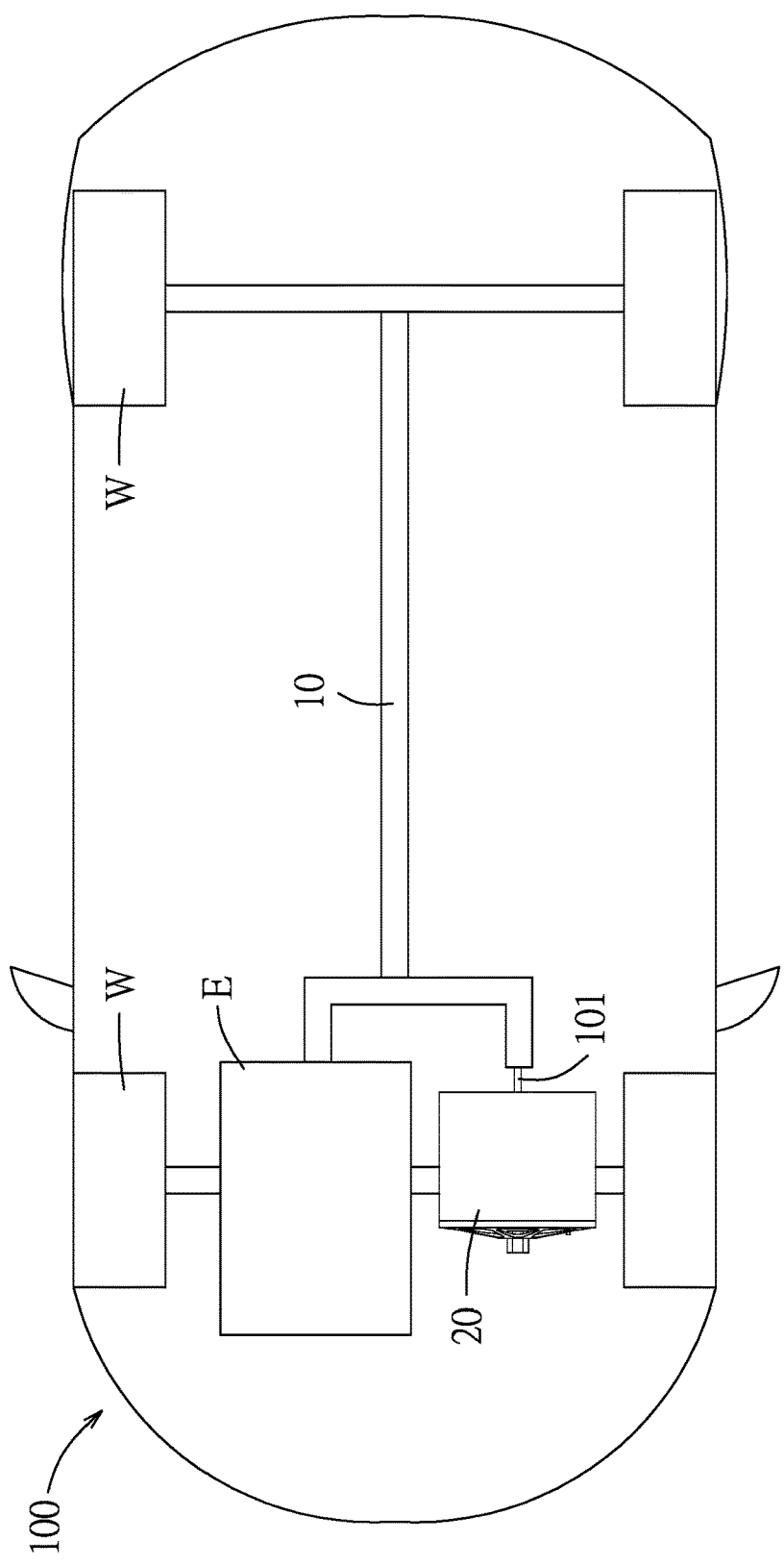
FIG. 1 is a schematic view illustrating that an embodiment of a resilient power device according to the disclosure is mounted to a rear-wheel drive vehicle.
Figure 2:
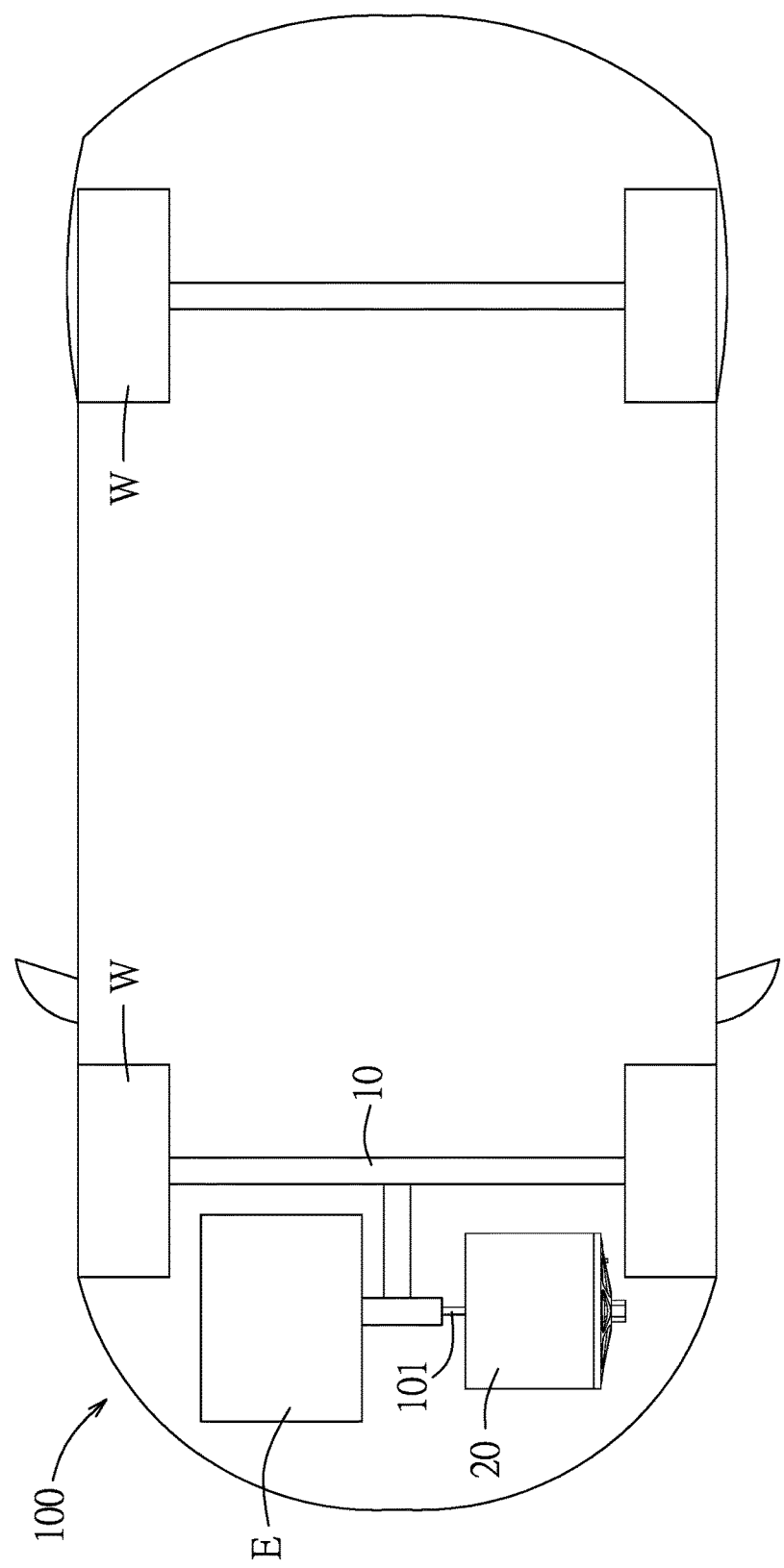
FIG. 2 is a schematic view illustrating that the embodiment is mounted to a front-wheel drive vehicle.
Figure 3:
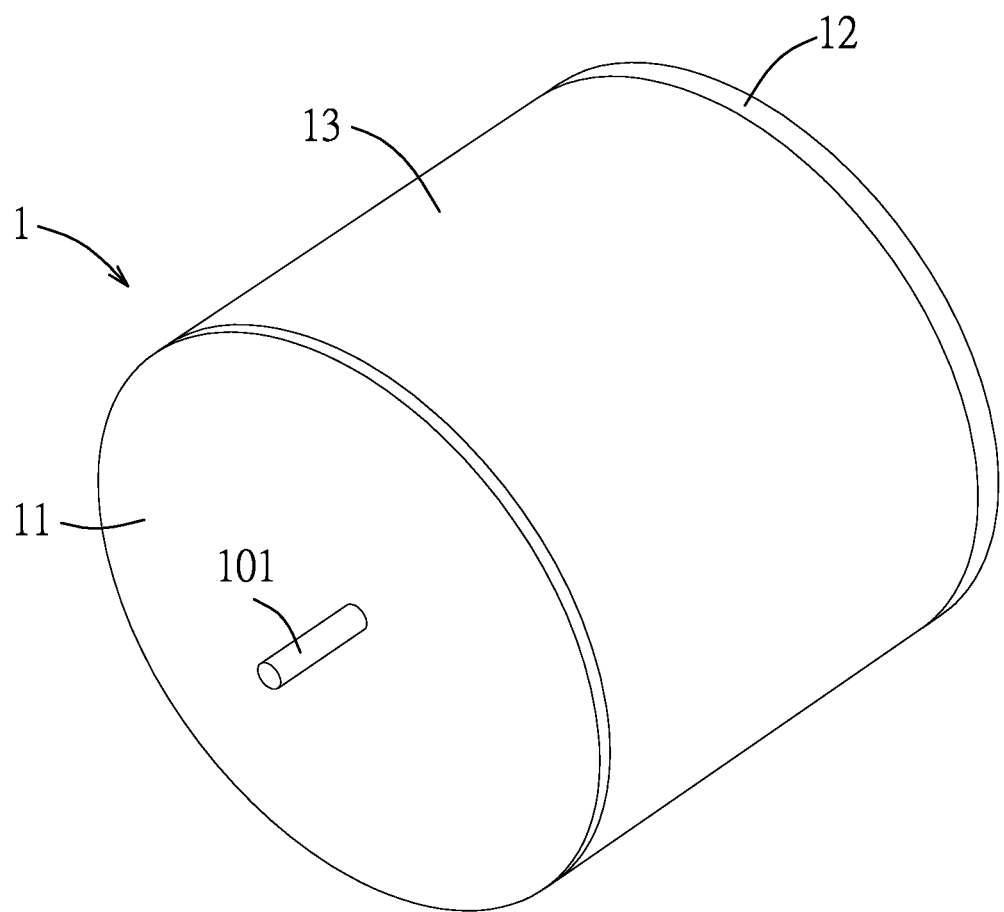
FIG. 3 is a perspective view of the embodiment.
Figure 4:
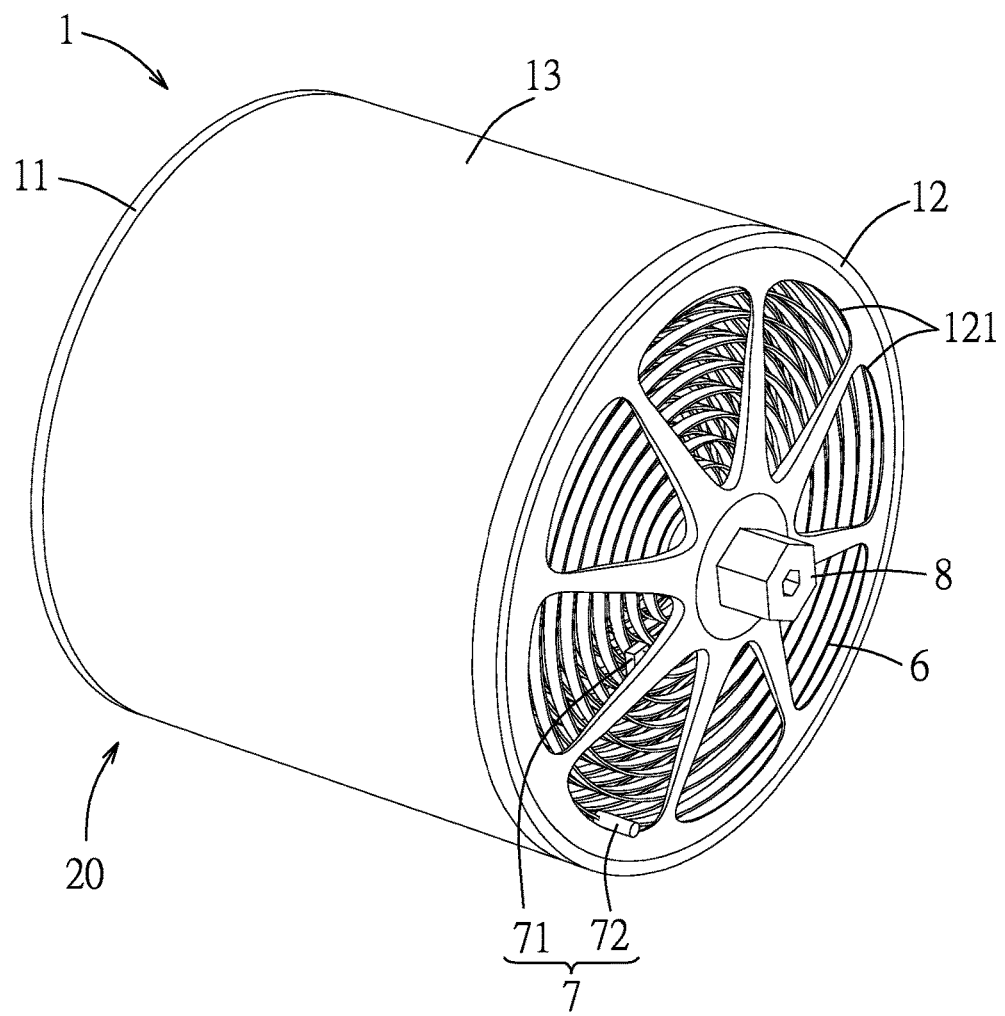
FIG. 4 is another perspective view of the embodiment.
Figure 5:
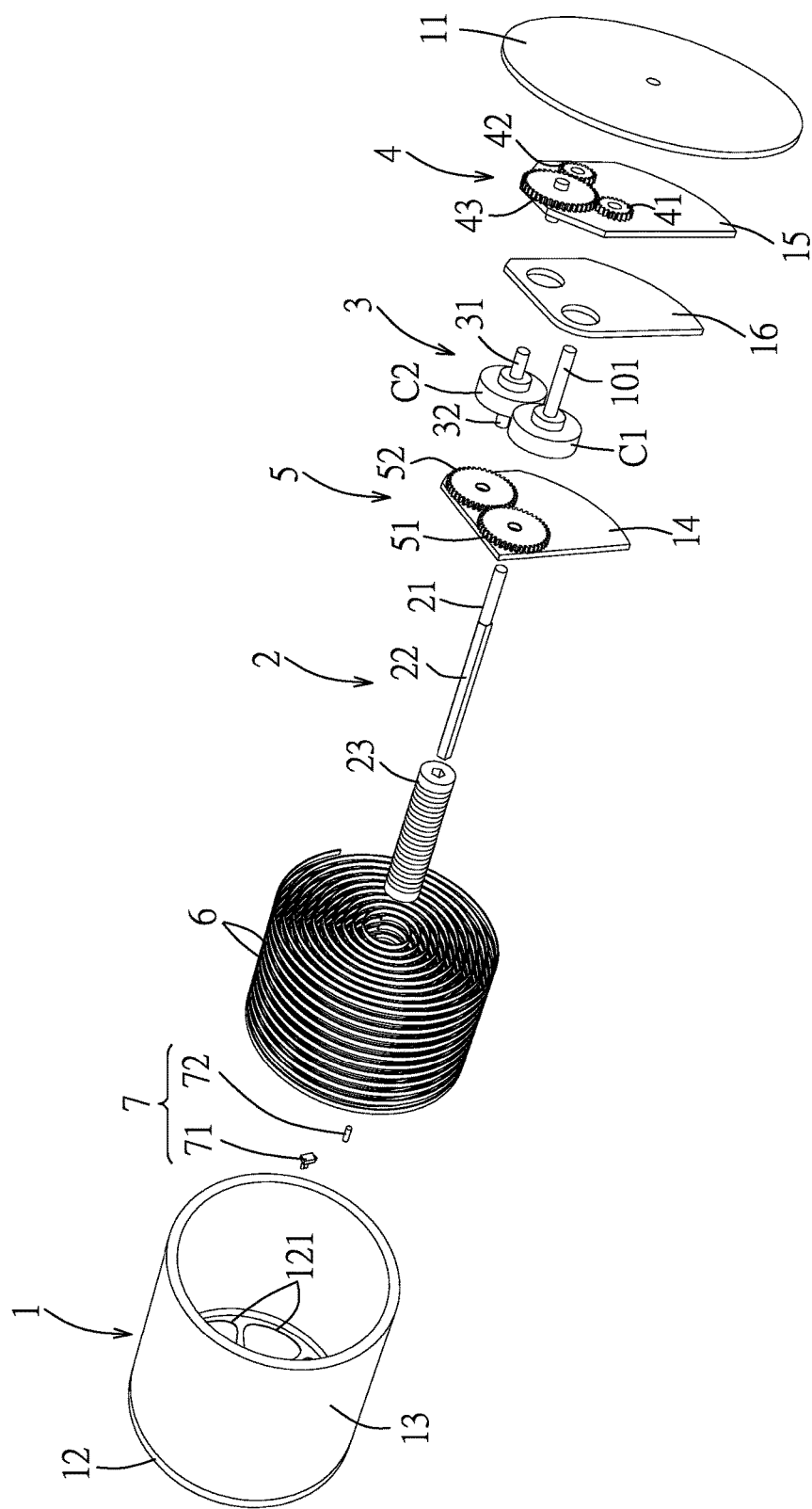
FIG. 5 is a partly exploded perspective view of the embodiment.
Figure 6:
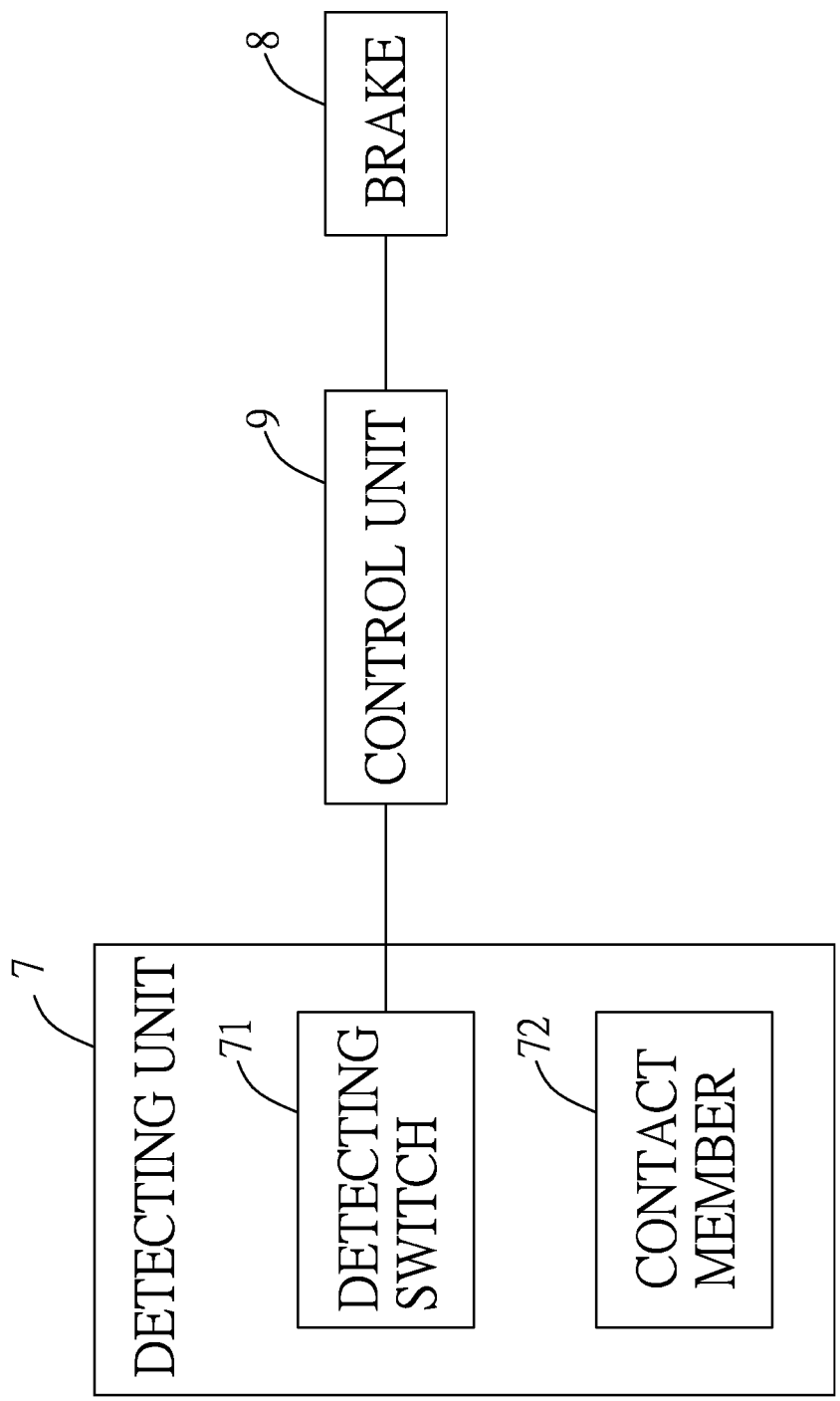
FIG. 6 is a block diagram illustrating connecting relationships among a control unit, a detecting unit and a brake.

Referring to FIGS. 1 to 3, the embodiment of a resilient power device 20 is adapted to drive a transmission rod 101 of a transmission unit 10 of a vehicle 100. The transmission rod 101 extends along a first axis. The vehicle 100 may be an electrical car, a hybrid car, or a car which only consumes gasoline, and may be front-wheel drive or rear-wheel drive. The vehicle 100 includes an engine (E) driving the transmission unit 10 to drive wheels (W) to rotate. The resilient power device 20 works with the engine (E) to drive the transmission unit 10. Referring to FIGS. 4 to 6, the resilient power device 20 includes a housing 1, a rotary shaft 2, a power release unit 3, a power storage clutch (C1), a power release clutch (C2), a first gear unit 4, a second gear unit 5, at least one resilient member 6, a detecting unit 7 and a brake 8.

With further reference to FIGS. 3 to 5, the housing 1 is adapted for the transmission rod 101 to extend rotatably therethrough. The housing 1 has a first wall 11, a second wall 12 spaced apart from the first wall 11, a surrounding wall 13 connected between the first and second walls 11, 12, a first plate 14 disposed between the first and second walls 11, 12, a second plate 15 disposed between the first wall 11 and the first plate 14, and a third plate 16 disposed between the first and second plates 14, 15. The first wall 11 and the second plate 15 are adapted to permit the transmission rod 101 to extend rotatably therethrough. The second wall 12 permits the rotary shaft 2 to extend rotatably therethrough, is disposed for mounting the brake 8, and is formed with a plurality of openings 121. The openings 121 are angularly spaced apart from each other, and are fan-shaped. In this embodiment, the number of the openings 121 is eight, and may be varied in other embodiments. The first plate 14 is fixedly connected to the surrounding wall 13, and permits the rotary shaft 2 and the power release unit 3 to extend rotatably therethrough. The second plate 15 is fixedly connected to the surrounding wall 13, and permits the power release unit 3 to extend rotatably therethrough. The third plate 16 is fixedly connected to the surrounding wall 13, and is disposed for mounting the power storage clutch (C1) and the power release clutch (C2). The first gear unit 4 abuts against the second plate 15, and the second gear unit 5 abuts against the first plate 14.

Figure 7:
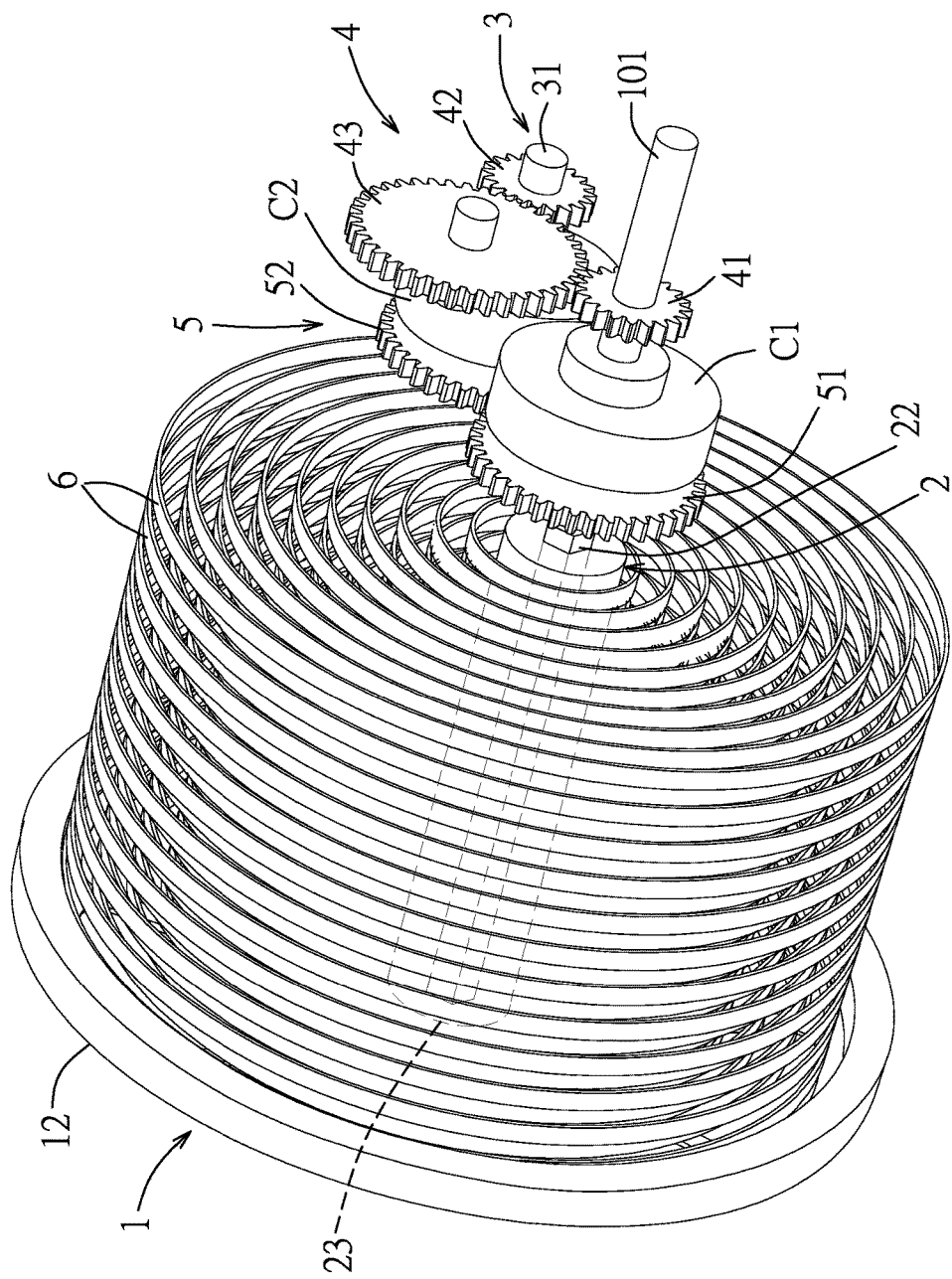
FIG. 7 is a fragmentary perspective view of the embodiment.
Figure 8:
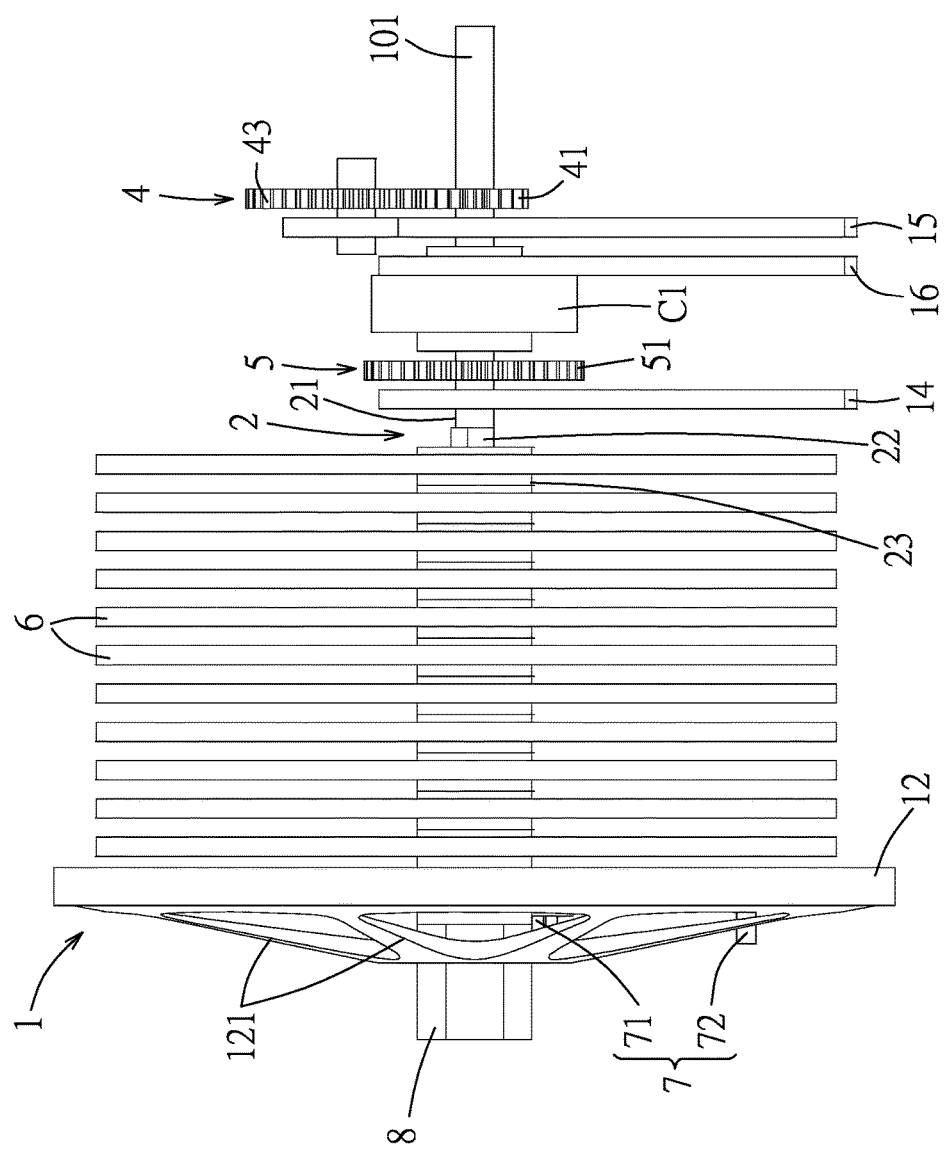
FIG. 8 is a fragmentary side view of the embodiment.
Figure 9:
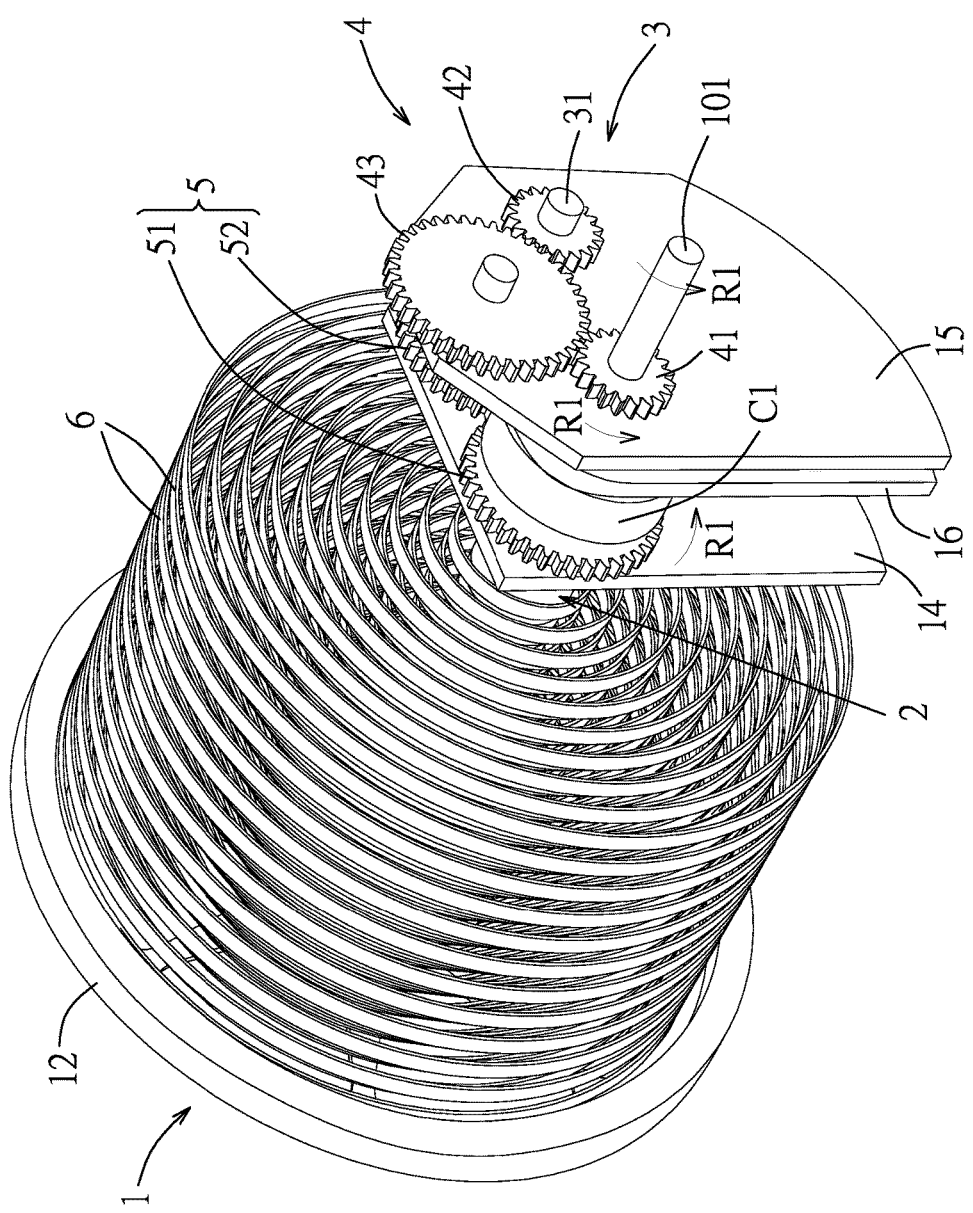
FIG. 9 is a fragmentary perspective view of the embodiment when the resilient power device is in a power storage state.
Figure 10:
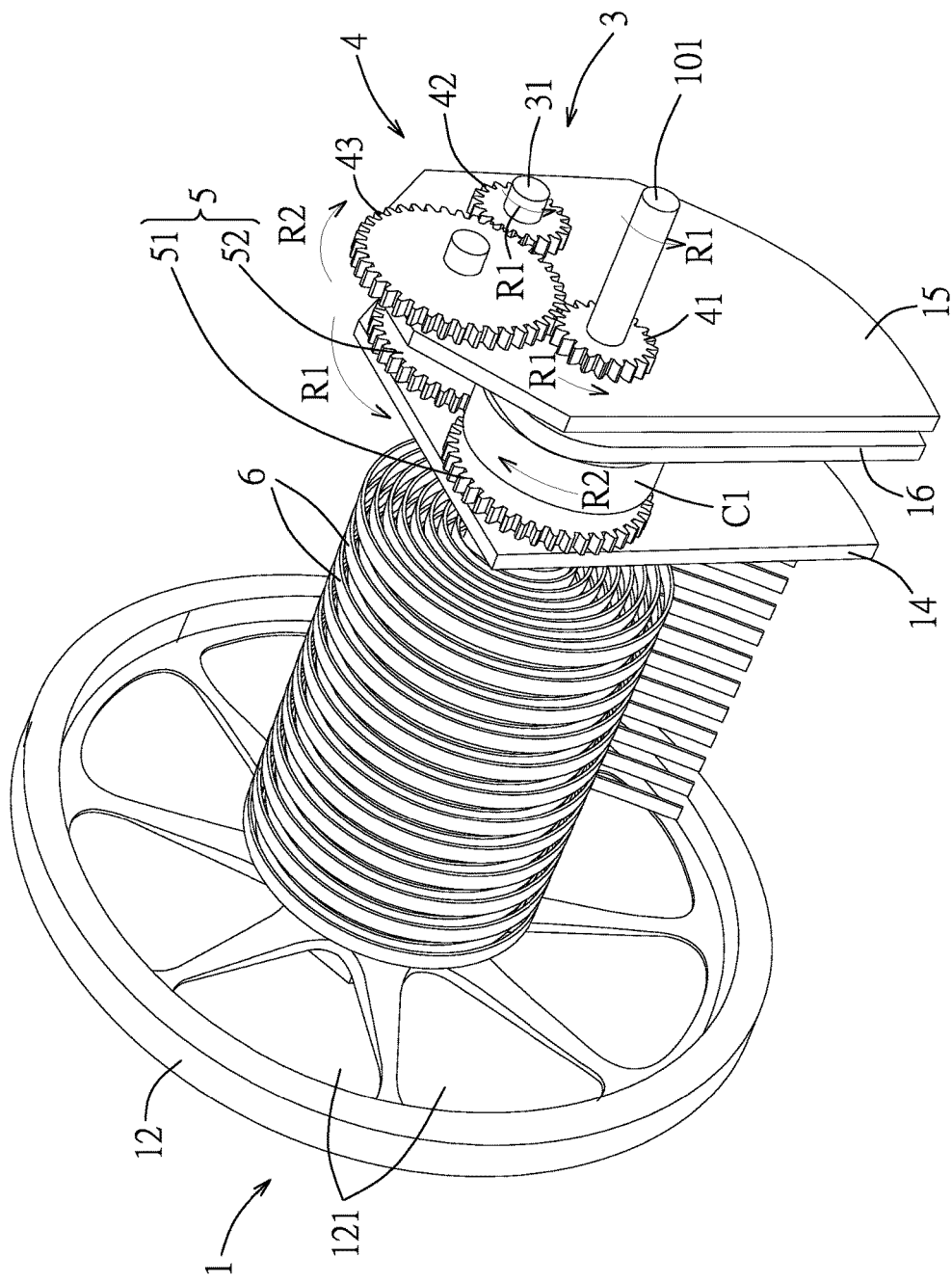
FIG. 10 is a fragmentary perspective view of the embodiment when the resilient power device is in a power release state.

Referring to FIGS. 4, 5 and 7, the rotary shaft 2 is adapted to extend and be spaced apart from the transmission rod 101 along the first axis. One end of the rotary shaft 2 extends rotatably through the first plate 14, and the other end of the rotary shaft 2 is connected to the brake 8. The rotary shaft 2 has a connecting portion 21, an engaging portion 22 and a sleeve portion 23. The connecting portion 21 extends rotatably through the first plate 14, has a round cross-section and is connected to the power storage clutch (C1). The engaging portion 22 has a polygonal cross section, is integrally and coaxially connected to the connecting portion 21. The sleeve portion 23 has a polygonal hole 231 engaging the engaging portion 22 in a fitting manner, and is connected to the brake 8. In this embodiment, the engaging portion 22 has a pentagonal cross-section, and the hole 231 is pentagonal. The shapes of the engaging portion 22 and the hole 231 may be varied in other embodiments on condition that the sleeve portion 23 can be driven to co-rotate with the engaging portion 22. The at least one resilient member 6 is configured as a spiral spring, and has an end fastened to an outer surface of the sleeve portion 23. It should be noted that, the rotary shaft 2 may only have a uniform round cross-section, and the end of the at least one resilient member 6 is fastened to the outer surface of the rotary shaft 2.

The power release unit 3 includes a first rod 31 and a second rod 32 mounted rotatably in the housing 1, extending and spaced apart from each other along a second axis that is parallel to the first axis, spaced apart from the rotary shaft 2, and adapted to be aligned respectively with the transmission rod 101 and the rotary rod 2 in a direction perpendicular to the first and second axes. The first rod 31 extends rotatably through the second plate 15, and the second rod 32 extends rotatably through the first plate 14.

The power storage clutch (C1) is adapted to be connected between the transmission rod 101 and the rotary shaft 2, so as to allow for connection and disconnection between the transmission rod 101 and the rotary shaft 2. The power release clutch (C2) is connected between the first and second rods 31, 32, so as to allow for connection and disconnection between the first and second rods 31, 32.

The first gear unit 4 is mounted to the first rod 31 and the transmission rod 101 such that, rotation is transferred between the first rod 31 and the transmission rod 101. The first gear unit 4 includes a transmission gear 41, a first gear 42, and a middle gear 43. The transmission gear 41 is sleeved fixedly onto the transmission rod 101, and abuts against the second plate 15 such that, relative rotation between the transmission gear 41 and the transmission rod 101 is prevented. The first gear 42 is sleeved fixedly onto the first rod 31, and abuts against the second plate 15 such that, relative rotation between the first gear 42 and the first rod 31 is prevented. The middle gear 43 is mounted to the second plate 15, and is disposed between and meshes with the transmission gear 41 and the first gear 42 for transmitting rotation between the transmission rod 101 and the first rod 31. It should be noted that, the middle gear 43 may be mounted to and abut against the first wall 11 of the housing 1 on condition that the middle gear 43 meshes with the transmission gear 41 and the first gear 42.

The second gear unit 5 is mounted to the rotary shaft 2 and the second rod 32 such that, rotation is transferred between the rotary shaft 2 and the second rod 32. The second gear unit 5 includes a rotary gear 51 and a second gear 52. The rotary gear 51 is sleeved fixedly onto the rotary shaft 2 such that, relative rotation between the rotary gear 51 and the rotary shaft 2 is prevented. The second gear 52 is sleeved fixedly onto the second rod 32 of the power release unit 3, and meshes with the rotary gear 51 such that, relative rotation between the second gear 52 and the second rod 32 is prevented.

The at least one resilient member 6 is connected between the housing 1 and the rotary shaft 2. In this embodiment, the resilient power device 20 includes a plurality of resilient members 6 juxtaposed between the second wall 12 and the first plate 14 along the first axis. One end of each of the resilient members 6 is fastened to the surrounding wall 13 of the housing 1, and the other end of each of the resilient members 6 is fastened to the outer surface of the sleeve portion 23 of the rotary shaft 2.

Figure 11:
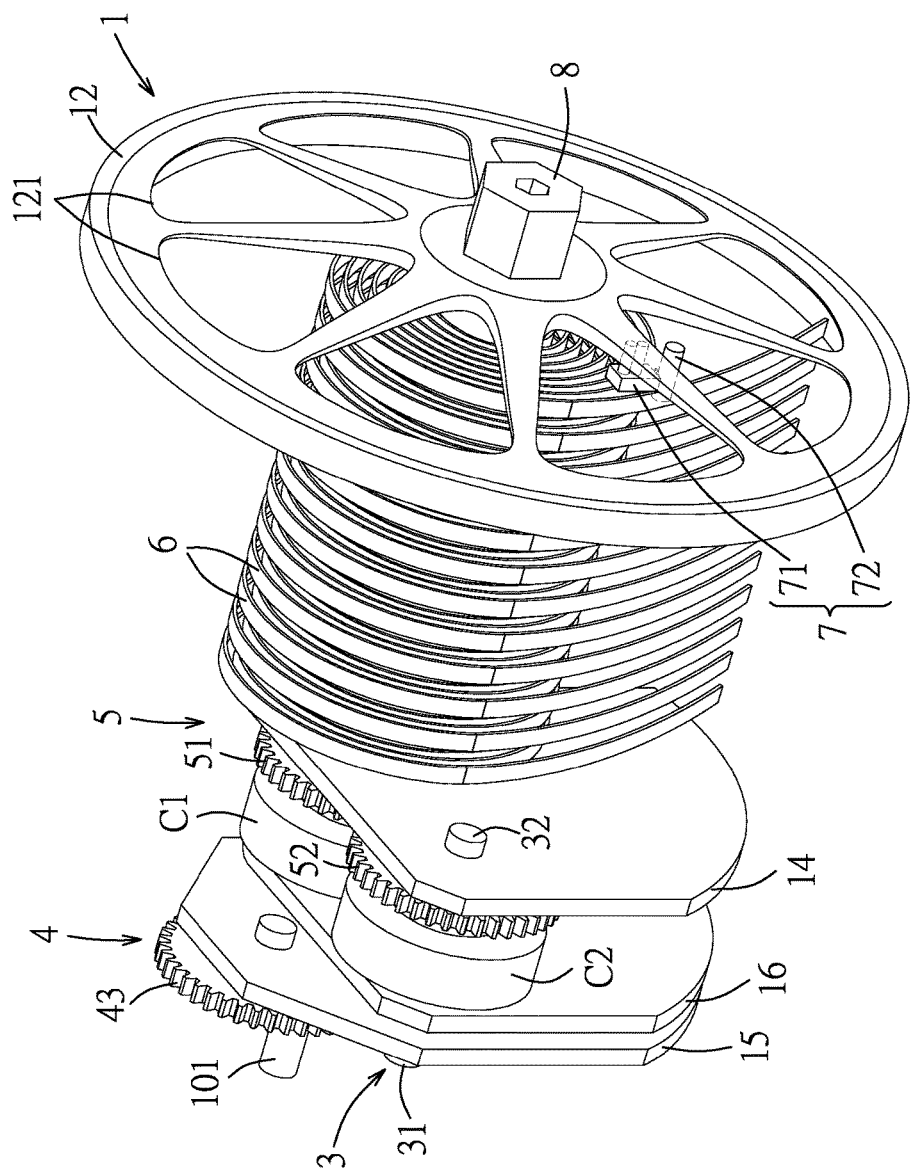
FIG. 11 is another fragmentary perspective view of the embodiment when the resilient power device is in the power release state.

Referring to FIGS. 1, 5, 6 and 8, the detecting unit is disposed for detecting the tightness of the resilient members 6, and includes a detecting switch 71 and a contact member 72 mounted to the second wall 12 of the housing 1. The detecting switch 71 is a micro switch, and is electrically connected to a control unit 9 of the vehicle 100. In this embodiment, the control unit 9 is a vehicle control unit (VCU) disposed for controlling operation of the vehicle 100. The contact member 72 is cylindrical, and is mounted to a rear end of one of the resilient members 6 which is proximate to the second wall 12 of the housing 1 (see FIG. 11).

The brake 8 is mounted to the second wall 12 of the housing 1, is connected to the sleeve portion 23 of the rotary shaft 2, and is electrically connected to the control unit 9. In this embodiment, the brake 8 is a magnetic brake, and since the structure of the magnetic brake is well-known in the art, details thereof are thereby omitted herein for the sake of brevity.

Referring to FIGS. 1, 7, and 9 to 11, during operation, the resilient power device 20 is transformable between a power storage state and a power release state. When the resilient power device 20 is in the power storage state (see FIG. 9), the transmission rod 101 and the rotary shaft 2 are interconnected by the power storage clutch (C1), and the first and second rods 31, 32 are disconnected from each other by the power release clutch (C2), so as to allow the transmission rod 101 and the rotary shaft 2 to rotate in a first rotational direction (R1), thereby deforming the resilient members 6 to store an elastic potential energy when the vehicle 100 moves forwardly. When the resilient members 6 are deformed to store the elastic potential energy, the contact member 72 gradually approaches the detecting switch 71. When the contact member 72 comes into contact with the detecting switch 71 (see FIG. 11), the resilient members 6 are fully tightened, and at this moment, the detecting switch 71 sends a signal to the control unit 9 to control the power storage clutch (C1) to disconnect the transmission rod 101 and the rotary shaft 2. In such manner, the transmission rod 101 cannot drive the rotary shaft 2 to further deform the resilient members 6. At the same moment, the control unit 9 also drives the brake 8 to work for preventing the rotary shaft 2 from rotating in a second rotational direction (R2), which is opposite to the first rotational direction (R1) such that, lost of elastic potential energy is prevented. When the resilient power device is transformed to the power release state (see FIG. 10), the transmission rod 101 and the rotary shaft 2 are disconnected from each other by the power storage clutch (C1), and the first and second rods (31, 32) are interconnected by the power release clutch (C2). At the same moment, the control unit 9 stops operation of the brake 8 so as to allow the rotary shaft 2 to rotate in the second rotational direction (R2), so as to return the resilient members 6 to their original shape, thereby releasing the elastic potential energy. Subsequently, since the rotary gear 51 of the second gear unit 5 rotates in the second rotational direction (R2) with the rotary shaft 2, the rotary gear 51 drives the second gear 52, the power release unit 3 and the first gear 42 of the first gear unit 4 to rotate in the first rotational direction (R1). The middle gear 43 is then driven by the first gear 42 to rotate in the second rotational direction (R2), and drives the transmission gear 41 and the transmission rod 101 to rotate in the first rotational direction (R1).

In conclusion, with the configuration of the power resilient device 20, energy consumed for the vehicle 100 to accelerate in a starting state is saved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A resilient power device adapted to drive a transmission rod of a vehicle, which extends along a first axis, said resilient power device comprising:
    a housing adapted for the transmission rod to extend rotatably thereinto;
    a rotary shaft adapted to extend and be spaced apart from the transmission rod along the first axis;
    a power release unit including a first rod and a second rod that are mounted rotatably in said housing, that extend and are spaced apart from each other along a second axis parallel to the first axis, that are spaced apart from said rotary shaft, and that are adapted to be aligned respectively with the transmission rod and said rotary shaft in a direction perpendicular to the first and second axes;
    a power storage clutch adapted to be connected between the transmission rod and said rotary shaft, so as to allow for connection and disconnection between the transmission rod and said rotary shaft;
    a power release clutch connected between said first and second rods, so as to allow for connection and disconnection between said first and second rods;
    a first gear unit mounted to said first rod and the transmission rod such that, rotation is transferred between said first rod and the transmission rod;
    a second gear unit mounted to said rotary shaft and said second rod such that, rotation is transferred between said rotary shaft and said second rod; and
    at least one resilient member connected between said housing and said rotary shaft;
    wherein said resilient power device is transformable between a power storage state and a power release state such that, when said resilient power device is in the power storage state, the transmission rod and said rotary shaft are interconnected by said power storage clutch, and said first and second rods are disconnected from each other by said power release clutch, so as to allow the transmission rod and said rotary shaft to rotate in a first rotational direction, thereby deforming said at least one resilient member to store an elastic potential energy, and when said resilient power device is transformed to the power release state, the transmission rod and said rotary shaft are disconnected from each other by said power storage clutch, and said first and second rods are interconnected by said power release clutch, so as to allow said rotary shaft to rotate in a second rotational direction, which is opposite to the first rotational direction, so as to return said at least one resilient member to its original shape, thereby releasing the elastic potential energy, after which the transmission rod is rotated in the first rotational direction by said second gear unit, said power release unit and said first gear unit.

2. The resilient power device as claimed in claim 1, wherein said first gear unit includes a middle gear disposed between the transmission rod and said first rod of said power release unit for transmitting rotation between the transmission rod and said first rod.

3. The resilient power device as claimed in claim 2, wherein said first gear unit further includes a transmission gear sleeved fixedly onto the transmission rod, and meshing with said middle gear, and a first gear sleeved fixedly onto said first rod, and meshing with said middle gear.

4. The resilient power device as claimed in claim 3, wherein said second gear unit includes a rotary gear sleeved fixedly onto said rotary shaft, and a second gear sleeved fixedly onto said second rod of said power release unit, and meshing with said rotary gear.

5. The resilient power device as claimed in claim 4, wherein:
    said housing has a first wall adapted to permit the transmission rod to extend rotatably therethrough, a second wall spaced apart from said first wall, and permitting said rotary shaft to extend rotatably therethrough, a surrounding wall connected between said first and second walls, a first plate disposed between said first and second walls, and permitting said rotary shaft and said second rod to extend rotatably therethrough, and a second plate disposed between said first wall and said first plate, and adapted to permit the transmission rod and said first rod to extend rotatably therethrough; and said transmission gear and said first gear of said first gear unit abut against said second plate, and said second gear unit abuts against said first plate.

6. The resilient power device as claimed in claim 1, wherein:

said rotary shaft has a connecting portion, an engaging portion and a sleeve portion;

said connecting portion is connected to said power storage clutch, and is sleeved by said rotary gear;

said engaging portion has a polygonal cross section, is integrally and coaxially connected to said connecting portion;

said sleeve portion has a polygonal hole engaging said engaging portion in a fitting manner; and said at least one resilient member is configured as a spiral spring, and has an end fastened to an outer surface of said sleeve portion.

7. The resilient power device as claimed in claim 1, wherein said second wall of said housing is formed with a plurality of openings.

8. The resilient power device as claimed in claim 7, wherein said openings of said second wall are angularly spaced apart from each other, and are fan-shaped.

\* \* \* \* \*